United States Patent [19]

Moore

[11] Patent Number: 5,874,680

[45] Date of Patent: Feb. 23, 1999

[54] COMBINATION IN-LINE PRESSURE SENSOR AND PORTABLE GAUGE HEAD

[76] Inventor: Randy A. Moore, 1808 Franklin, Lexington, Mo. 64067

[21] Appl. No.: 929,152

[22] Filed: Aug. 11, 1997

Related U.S. Application Data

[60] Provisional application No. 60/023,812, Aug. 12, 1996.
[51] Int. Cl.$^6$ ............................ G01L 7/00; G01L 9/14; G01L 7/06
[52] U.S. Cl. ........................ 73/756; 73/728; 73/729.1
[58] Field of Search ....................... 116/204, 266–272; 73/756, 729.1, 728, 722, 146.8

[56] References Cited

U.S. PATENT DOCUMENTS

| | | | |
|---|---|---|---|
| 4,807,468 | 2/1989 | Galan | 73/146.5 |
| 4,918,423 | 4/1990 | Fukuyama et al. | 73/146.8 X |
| 5,392,653 | 2/1995 | Zanger et al. | 73/726 X |

*Primary Examiner*—Joseph L. Felber
*Attorney, Agent, or Firm*—Jonathan A. Bay

[57] ABSTRACT

A combination of an in-line pressure sensor and a portable gauge head are arranged such that they can be quickly connected and disconnected together and apart for giving a quick pressure reading of the pressure sensed by the sensor. The in-line sensor is semi-permanently installed in a fluid system. The portable gauge head, during a given use, is releasably connected or coupled to the in-line sensor to detect a message signal given off by the in-line sensor and convert that message signal into a visible indication of the pressure sensed by the in-line sensor. After a given use, the portable gauge head is disconnected or de-coupled from the in-line sensor and is transported elsewhere either for use with another in-line sensor at a different location or else for storage between uses.

20 Claims, 2 Drawing Sheets

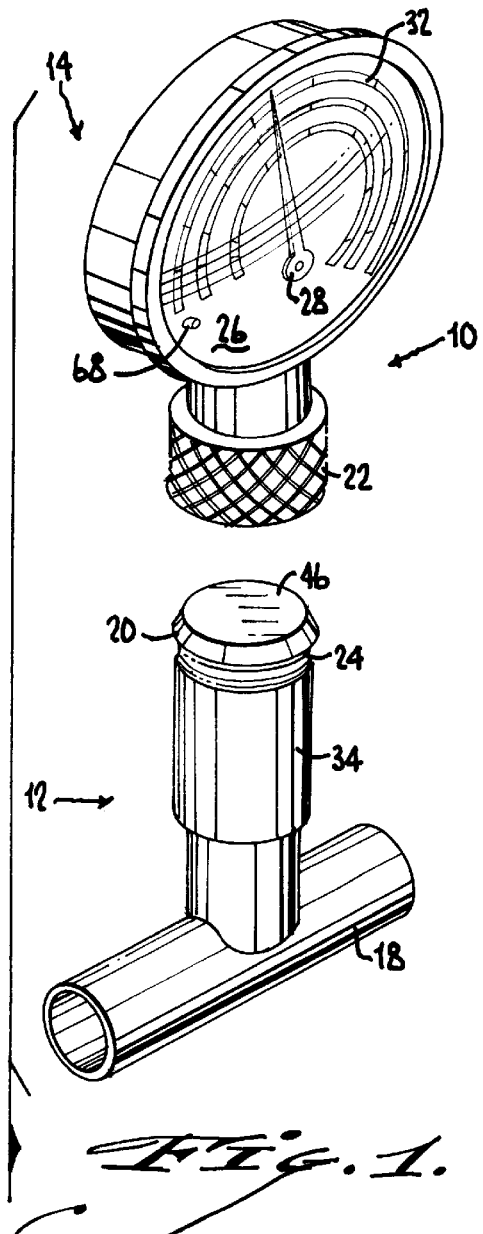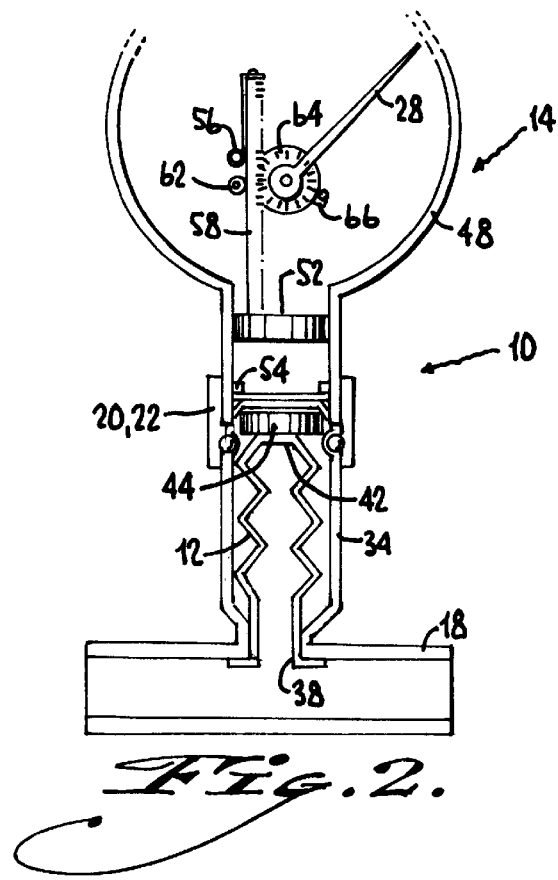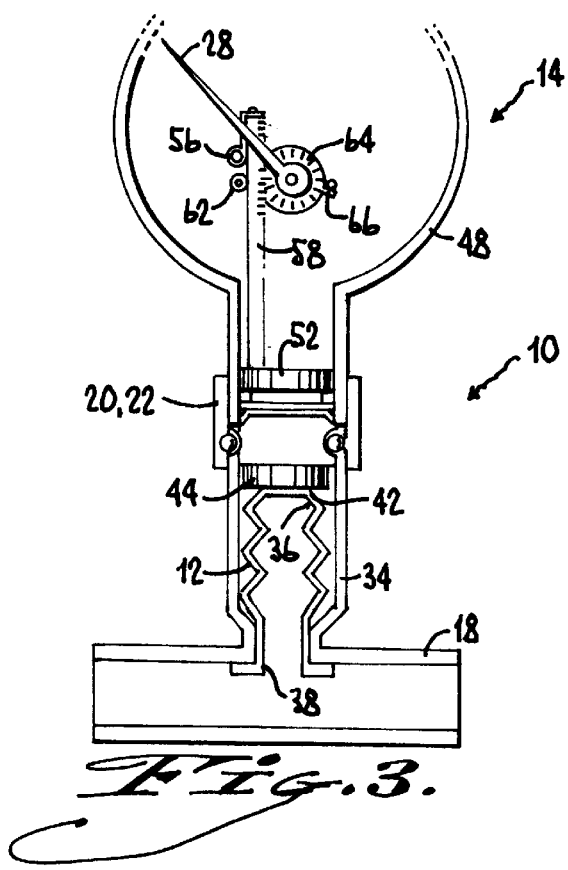

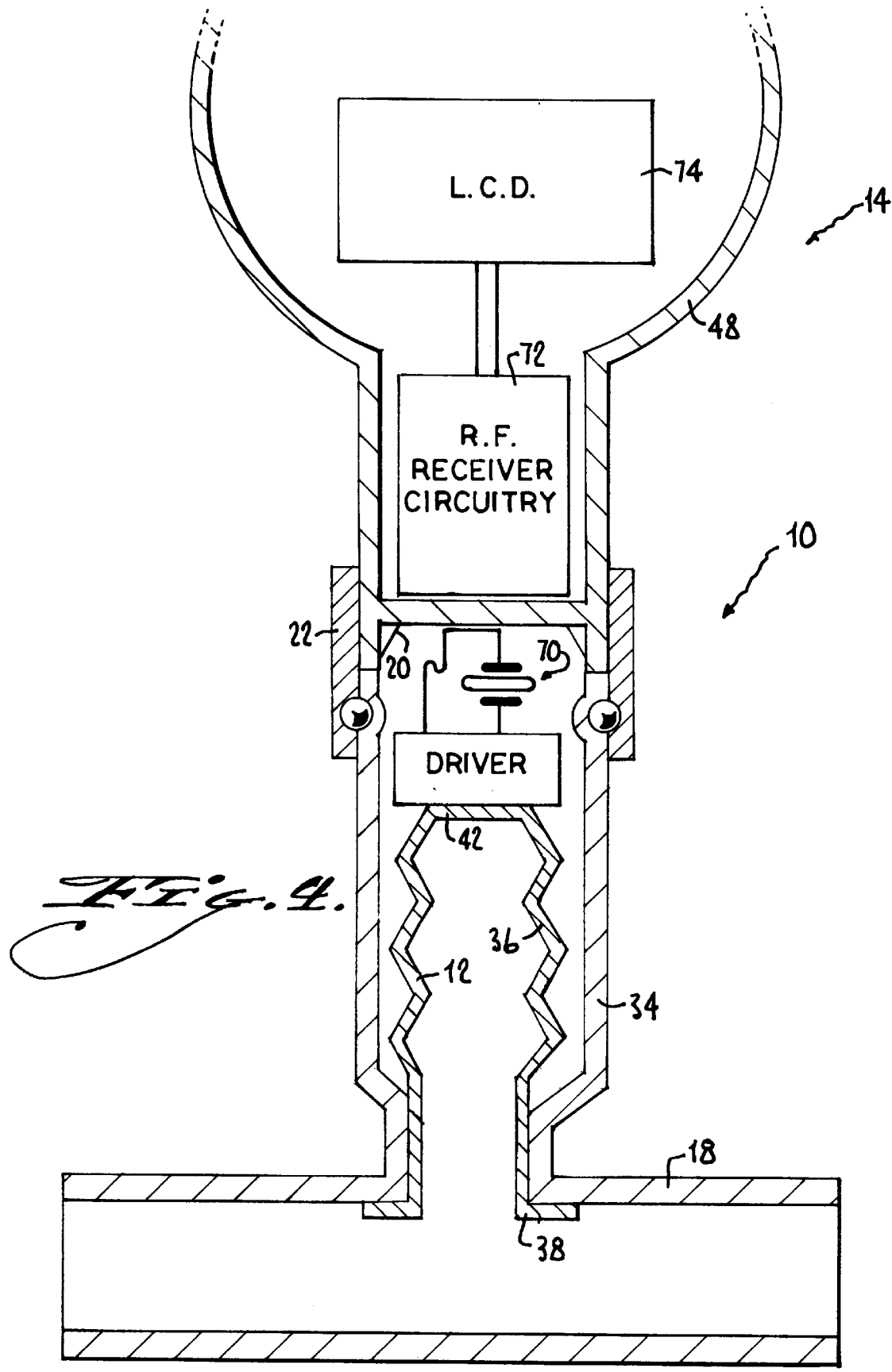

COMBINATION IN-LINE PRESSURE SENSOR AND PORTABLE GAUGE HEAD

CROSS-REFERENCE TO PROVISIONAL APPLICATION(S)

This application claims the benefit of U.S. Provisional Application Ser. No. 60/023,812, filed Aug. 12, 1996.

BACKGROUND AND SUMMARY OF THE INVENTION

The invention relates to pressure gauges, and more particularly relates to a combination in-line pressure sensor and portable gauge head. The portable gauge head, during a given use, is releasably coupled to the in-line sensor to detect a message signal given off by the in-line sensor and convert that message signal into a visible indication of the pressure sensed by the in-line sensor. After a given use, the portable gauge head is decoupled from the in-line sensor and is transported elsewhere either for use with another in-line sensor at a different location or else for storage between uses.

An example utility for the combination in-line pressure sensor and portable gauge head in accordance with the invention includes, without limitation, a car refrigerant system for the passenger air conditioning. The installation in a car refrigerant system would comprise placement of one in-line pressure sensor at the low-pressure test-and-service valve-fitting and placement of another in-line pressure sensor at the high-pressure test-and-service valve-fitting of the refrigerant circuit of the car air conditioning system.

Accordingly, an inventive aspect here includes that pressure measurements can be taken at either the low- or the high-pressure test-and-service fitting without risking leaking any refrigerant at all to the atmosphere. The in-line pressure sensors remain semi-permanently installed in the refrigerant circuit. The portable gauge head is only brought to the scene whenever a user wishes to take a pressure measurement. The same gauge head can be used at either the high or the low side of the test-and-service valve-fittings. Indeed, the same gauge head can be used repetitively over and over to service any car that is outfitted with a pair of in-line sensors in accordance with the invention.

Thus it is another inventive aspect that a user of the combination in-line pressure sensor(s) and portable gauge head in accordance with the invention, is enabled to diagnose a car's refrigerant circuit without opening the circuit. The user need only possess a single gauge head to diagnose one car after another if the successive cars are configured with the in-line sensors in accordance with the invention.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a combination in-line pressure sensor and portable gauge head in accordance with the invention, wherein the in-line pressure sensor is shown configured in a T-fitting for affixing in-line in any given fluid conduit (not shown);

FIG. 2 is a front elevation view, substantially in section, of the portable gauge head and the in-line pressure sensor of FIG. 1, except shown coupled for use, wherein the needle on the dial of the portable gauge head is giving visible indication of the pressure sensed by the in-line sensor;

FIG. 3 is a view comparable to FIG. 2, except that the needle on the dial is in a changed position corresponding naturally indicative to a different pressure sensed by the in-line sensor; and, FIG. 4 is a view comparable to FIG. 3, except showing an alternate version of a combination in-line pressure sensor and portable gauge head in accordance with the invention.

DETAILED DESCRIPTION OF THE PREFERRED EMBODIMENTS

FIG. 1 shows a combination 10 of an in-line pressure sensor 12 and a portable gauge head 14 in accordance with the invention. In this combination 10, the pressure-sensing unit 12 and the gauge head 14 are separable components of the combination 10. That way, the sensing unit 12 can be installed semi-permanently into the tubing or piping of a fluid system (not shown), while the gauge head 14 is portable for use and re-use on an "as-needed" basis. After any given use of the gauge head 14, it can be removed for use on a like in-line sensor elsewhere (another is not shown, only one is shown), or else stored away between uses. Thus, one gauge head 14 can service an indefinite number of in-line sensors. Also, numerous in-line sensors 12 can be installed in a given fluid system such that the system need not be opened in order to get pressure measurements at various locations of the system. This is especially useful for, among other uses and without limitation, car air conditioning systems (not shown).

That is to say, for example only and without limitation, that two in-line pressure sensors 12 in accordance with the invention can be installed semi-permanently in the car refrigerant loop. One in-line sensor would be installed at the low-pressure test-and-service valve-fitting (this is not shown) of the refrigerant circuit of the car air conditioning system, and the other in-line sensor would be installed at the high-pressure test-and-service valve-fitting. Given the foregoing installation, a user can temporarily couple the gauge head 14 to either valve-fitting as desired, for a sufficient duration to record a pressure measurement. The user can thus record the pressure measurement at either the high side or else the low side of the refrigerant loop, or both in succession, without opening the refrigerant circuit. Accordingly, pressure measurements can be taken without risking leaking any refrigerant at all to the atmosphere. The same gauge head 14 can be used at either the high or the low side of the test-and-service valve-fittings. Indeed, the same gauge head 14 can be used repetitively over and over to service any car that is outfitted with a pair of in-line sensors 12 in accordance with the invention.

Thus it is an inventive aspect that a user of the combination 10 of the in-line pressure sensor 12 and the portable gauge head 14 in accordance with the invention, is enabled to diagnose a car's refrigerant circuit without opening the circuit. The user need only possess a single gauge head 14 to diagnose one car after another if the successive cars are configured with the in-line sensors 12 in accordance with the invention. These and other features and objects will be apparent in connection with the following discussion of preferred embodiments and examples.

In FIG. 1, the pressure sensor 12 is configured in a T-fitting 18 that allows in-line placement in a tube conduit (not shown) via any well-known tube connections. The pressure sensor 12 can be configured in other ways in accordance with the invention, and the T-fitting 18 is shown for convenience in this description and is not limiting. The inverted stem of the inverted-T shaped sensor 12 defines a nipple extension 20, and includes a quick-connect and -disconnect arrangement for quick connection and disconnection with a mating socket or locking ball arrangement 22 on the gauge head 14. FIGS. 2 and 3 show the locking arrangement between the sensor 12 and gauge head 14. This arrangement comprises locking balls in the gauge head 14 as well as a circumferential locking groove 24 (FIG. 1) in the nipple extension 20 of the sensor 12. This is a conventional quick connection and disconnection arrangement that is known in the art.

FIG. 1 shows that the gauge head 14 includes a dial 26 that has multiple concentric scales or rings of gradation 32, and, a needle 28 that is pivotal across on the dial 26 and these multiple rings of gradation. The dial 26 includes a needle rest 68. The multiple gradation scales or rings 32 are scaled appropriately for whatever purpose the invention will be put. If, for example, the use environment of the combination 10 is going to be the car refrigerant-servicing industry, then example appropriate scales 32 would include a pair such that one ring 32 would correspond to pressure readings between 0 and 550 psi gauge, and another ring 32 would correspond to readings between −14.7 and 155 psi gauge (i.e., from a vacuum to positive 155 psi). The pair of ranges correspond to whether the gauge head 14 is coupled onto the high- or low-side respectively of the test-and-service valve-fittings of a car refrigerant circuit. The dial 26 and needle 28's sensitivity and range can be scaled accordingly for other applications besides the car air-conditioning service industry as can be readily accomplished by designers and fabricators of this kind of equipment having ordinary skill in the art.

The depiction here and description of an analog dial 26 is given merely for convenience in this specification as the dial 26 could be replaced by other analog and/or digital displays, now known or later developed, and such other displays would still be encompassed by the invention here. Accordingly, the use of the analog dial 26 shown by the drawings in this specification is given for exemplary purposes only and is not limiting.

FIGS. 2 and 3 show more detail of the in-line pressure sensor 12. It comprises a housing 34 preferably made of copper or brass or a like suitable material that won't interfere with a magnetic couple in which one magnet is inside the housing 34 and the other is outside. The nipple extension 20 portion of the housing 34 has a relatively thicker wall for, among other purposes, allowing formation of the locking groove 24 therein. The housing 34 defines an internal chamber in which is affixed a bellows 36. The bellows 36 is flared out and open at one end 38 (i.e., the lower end as oriented and shown in the figures). The bellows 36 is closed at the opposite or upper end 42. The closed end 42 carries a magnet 44 which is permanently affixed thereto by bonding or cement and the like.

The flared end 38 is flared out as shown so that, during assembly, the bellows 36 is inserted by press-fitting straight into the internal chamber of the housing 34 until the flared end 38 locks in place as shown. A fluid-tight seal can be formed between the flared end 38 the sensor housing 34 via solder, braze, welds, adhesive and the like.

The flared end 38 of the bellows 36 is permanently affixed to the sensor housing 34 as shown. The magnet 44 on the bellows 36 is movable with the changing size of the bellows 36 between extreme retracted and extended positions. Displacement of the bellows 36's closed end 42 varies with the pressure differential between the internal pressure in the bellows 36 (which is the pressure of the fluid admitted in through the open flared end 38) and the local pressure which surrounds the exterior of the bellows 36. FIG. 2 shows the bellows 36 in a given extended position corresponding to a given internal pressure. In FIG. 3 the bellows 36 has changed and is relatively retracted relative to FIG. 2 which corresponding to a relatively lesser internal pressure. The terminal end of the nipple extension has a cap 46 (see FIG. 1) brazed, welded or otherwise affixed across the top thereof. Like the sensor housing 34, the cap 46 is also preferably made of brass or copper or the like, all which are suitable materials that won't interfere with the action of a magnetic couple.

The gauge head 14 comprises a housing 48 which includes the socket arrangement 22 for quick connection and disconnection to the nipple extension 20 of the sensor housing 34. FIG. 1 shows the gauge head 14 and nipple extension 20 disconnected. FIGS. 2 and 3 show the gauge head 14 and nipple extension 20 connected. The connection between the gauge head 14 and nipple extension 20 aligns them together in a given alignment that is substantially repeatable one instance of coupling and de-coupling after another.

The housing 48 includes a cylindrical extension that carries the socket 22, this cylindrical extension being formed to define an internal cylindrical chamber in which is located a cylindrical magnet 52 that can reciprocate up and down in the chamber. The magnet 52 is movable between extreme positions including an extreme extended (or down) position in which it limits out against stops 54 (i.e., the stops 54 are referenced in FIG. 2, the extreme extended or stopped position is shown by FIG. 3). The magnet 52 is normally biased into its extreme extended or stopped position by a constant-force spring 56. The action of the constant-force spring 56 is known in the art (i.e., as used in common tape measures), and its opposition force is generally constant with deflection rather than varying proportionately with deflection as occurs with ordinary springs. The magnet 52 carries an elongated rack gear 58 which extends away from the magnet 52 to reciprocate between an idler wheel 62 and a pinion 64 with which the rack gear 58 is enmeshed. The pinion 64 is connected to drive the dial needle 28. The pinion 64 and needle 28 together are connected to a hairspring 66. On the back of the housing 48, there is an adjustment screw (not shown) coupled to the hairspring 66 to allow adjustment of the dial needle 28 for calibration purposes as is known in the art.

Given the foregoing, the magnet 44 in the in-line sensor 12 and the magnet 52 in the gauge head 14 form a magnetic couple when the gauge head 14 and sensor 12 are connected or coupled as shown in FIGS. 2 and 3. The principles of magnetic repulsion operate here such that the position of the magnet 44 in the in-line sensor 12 induces the magnet 52 in the gauge head 14 to move away from the sensor magnet 44, depending on the position of the magnet 44 in the sensor 12.

Thus, the lines of magnetic flux that emanate from the magnet 44 in the sensor 12 act as a message signal that is remotely detectable by the magnet 52 in the gauge head 14. Displacement of the magnet 52 in the gauge head 14 from its extreme extended or stop position (e.g., as shown by FIG. 2 relative to FIG. 3) causes the dial needle 28 to rotate relatively clockwise. The gradations 32 on the dial 26 (FIG. 1) can be scaled and calibrated accordingly so that the dial needle 28 accurately indicates the true pressure that fills the bellows 36 in the in-line sensor 12.

Alternatively, as shown by FIG. 4, the in-line sensor 12 could be configured with a crystal or piezoelectric transducer 70 which is excited to oscillate and emit a perpetual resonating frequency. Such a miniature piezoelectric device 70 is disclosed, for example, by U.S. Pat. No. 5,488,351—Hedayatnia et al., and U.S. Pat. No. 3,651,576—Massa discloses a comparable miniature electroacoustic transducer. The transducer 70 would be mounted in the T-fitting 18 such that changes in pressure in the line would deform the transducer 70. Deformation in the transducer 70 would change its oscillating frequency, and hence the portable gauge head 14 would include a signal receiver 72 like a radio receiver responsive to a frequency signal. The portable gauge head 14 would thus have to be outfitted with a display 74 such as needle (not shown) or LED or LCD (e.g., indicated as 74 in FIG. 4) and the like which would indicate pressure correlative to the transducer frequency.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A combination installation pressure sensor and portable gauge head, comprising:
   an installation pressure sensor adapted for installation in or on a given fluid system, the installation pressure sensor having a device responsive to pressure changes in the fluid system and emitting a message signal correlative to the pressure in the fluid system; and
   a portable gauge head having a signal detector for detecting said message signal of the installation pressure sensor, the portable gauge head being adapted for removable placement in proximity to the installation pressure sensor to allow a coupling of the signal between said pressure-responsive device of the installation pressure sensor and said detector of the portable gauge head whereby a pressure measurement can be taken;
   wherein the pressure responsive device comprises a bellows installed in or on the given fluid system that the bellows distends or foreshortens in responsive to pressure increases or decreases, respectively;
   wherein the bellows carries a magnet such and the message signal is lines of magnetism; and,
   wherein the signal detector in the portable gauge head comprises a movable magnet which, for the duration while the portable gauge head is placed in removable proximity to the installation pressure sensor to allow a magnetic couple to be achieved between the two magnets, said detector magnet is displaced via magnetic repulsion from the magnet of the pressure responsive device and its displacement is correlative to a pressure measurement.

2. The combination installation pressure sensor and portable gauge head of claim 1, wherein the pressure responsive device includes a signal generator for emitting a signal comprising one of magnetism and electro-magnetism.

3. The combination installation pressure sensor and portable gauge head of claim 2, wherein the signal generator comprises one of a magnet and a crystal respectively.

4. The combination installation pressure sensor and portable gauge head of claim 1, wherein portable gauge head comprises one of an analog display and a digital display to provide visual indication of the taken pressure measurement.

5. The combination installation pressure sensor and portable gauge head of claim 1, wherein the installation pressure sensor is configured in the extension or stem of a T-fitting for installation in-line in a conduit of the fluid system.

6. The combination installation pressure sensor and portable gauge head of claim 1, wherein the installation pressure sensor includes a given mechanical-connection/-disconnection arrangement and the portable gauge head includes a corresponding mechanical-connection/-disconnection arrangement, the connection together of which establishes a given alignment between the installation pressure sensor and portable gauge head during the signal coupling.

7. A combination installation pressure sensor and portable gauge head comprising:
   an installation pressure sensor adapted for installation in or on a given fluid system, the installation pressure sensor having a device responsive to pressure changes in the fluid system and emitting a message signal correlative to the pressure in the fluid system; and
   a portable gauge head having a signal detector for detecting said message signal of the installation pressure sensor, the portable gauge head being adapted for removable placement in proximity to the installation pressure sensor to allow a coupling of the signal between said pressure-responsive device of the installation pressure sensor and said detector of the portable gauge head whereby a pressure measurement can be taken;
   wherein the installation pressure sensor includes a given mechanical-connection/-disconnection arrangement and the portable gauge head includes a corresponding mechanical-connection/-disconnection arrangement, which arrangements are configured to connect together substantially immovably relative each other in a hands free mechanically-held connection therebetween until disconnected by hand, in order to establish a substantially stabilized given alignment between the installation pressure sensor and portable gauge head during the signal coupling.

8. The combination installation pressure sensor and portable gauge head of claim 7, wherein the pressure responsive device includes a signal generator for emitting a signal comprising one of magnetism and electro-magnetism.

9. The combination installation pressure sensor and portable gauge head of claim 8, wherein the signal generator comprises one of a magnet and a crystal respectively.

10. The combination installation pressure sensor and portable gauge head of claim 7, wherein the pressure responsive device comprises a bellows installed in or on the given fluid system that the bellows distends or foreshortens in responsive to pressure increases or decreases, respectively.

11. The combination installation pressure sensor and portable gauge head of claim 10, wherein the bellows carries a magnet such and the message signal is lines of magnetism.

12. The combination installation pressure sensor and portable gauge head of claim 7, wherein portable gauge head comprises one of an analog display and a digital display to provide visual indication of the taken pressure measurement.

13. The combination installation pressure sensor and portable gauge head of claim 7, wherein the installation pressure sensor is configured in the extension or stem of a T-fitting for installation in-line in a conduit of the fluid system.

14. A combination installation pressure sensor and portable gauge head, comprising:

an installation pressure sensor adapted for installation in or on a given fluid system, the installation pressure sensor having a device responsive to pressure changes in the fluid system and emitting a message signal correlative to the pressure in the fluid system; and a portable gauge head having a signal detector for detecting said message signal of the installation pressure sensor, the portable gauge head being adapted for removable placement in proximity to the installation pressure sensor to allow a coupling of the signal between said pressure-responsive device of the installation pressure sensor and said detector of the portable gauge head whereby a pressure measurement can be taken;

wherein the installation pressure sensor includes a given mechanical-connection/-disconnection arrangement and the portable gauge head includes a corresponding mechanical-connection/-disconnection arrangement, the connection together of which establishes a given alignment between the installation pressure sensor and portable gauge head during the signal coupling; and, wherein the given mechanical-connection/-disconnection arrangement and the corresponding mechanical-connection/-disconnection arrangement comprise a nipple and locking ball mechanism respectively.

15. The combination installation pressure sensor and portable gauge head of claim 14, wherein the pressure responsive device comprises a bellows installed in or on the given fluid system that the bellows distends or foreshortens in responsive to pressure increases or decreases, respectively.

16. The combination installation pressure sensor and portable gauge head of claim 15, wherein the bellows carries a magnet such and the message signal is lines of magnetism.

17. The combination installation pressure sensor and portable gauge head of claim 14, wherein the pressure responsive device includes a signal generator for emitting a signal comprising one of magnetism and electro-magnetism.

18. The combination installation pressure sensor and portable gauge head of claim 17, wherein the signal generator comprises one of a magnet and a crystal respectively.

19. The combination installation pressure sensor and portable gauge head of claim 14, wherein portable gauge head comprises one of an analog display and a digital display to provide visual indication of the taken pressure measurement.

20. The combination installation pressure sensor and portable gauge head of claim 14, wherein the installation pressure sensor is configured in the extension or stem of a T-fitting for installation in-line in a conduit of the fluid system.

* * * * *